Figure 1:
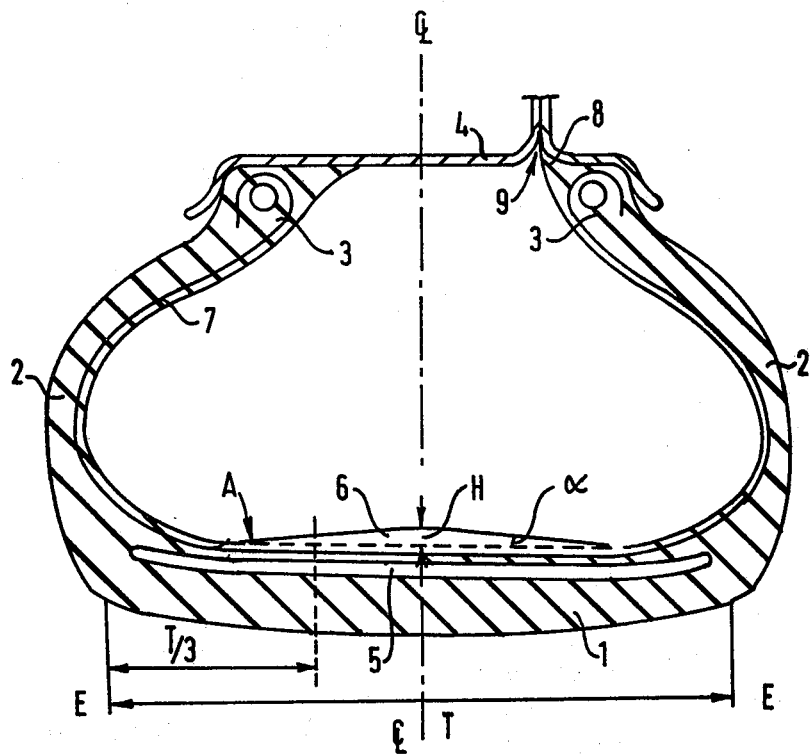

United States Patent
Swales et al.

[11] 3,977,455
[45] Aug. 31, 1976

[54] TIRES

[75] Inventors: Peter David Swales, Woolhampton, near Redding; Richard John Wakelin, Huby, both of England

[73] Assignee: Dunlop Limited, London, England

[22] Filed: June 18, 1974

[21] Appl. No.: 480,383

[30] Foreign Application Priority Data
June 28, 1973 United Kingdom............... 30879/73

[52] U.S. Cl. ............................ 152/330 L; 152/360; 152/361 R; 152/374
[51] Int. Cl.² ...................... B60C 17/00; B60C 9/18
[58] Field of Search......... 152/153, 209 WT, 330 R, 152/330 L, 330 RF, 352, 354–360, 374, 361 R

[56] References Cited
UNITED STATES PATENTS

| | | |
|---|---|---|
| 1,678,211 | 7/1928 | Davidson .................... 152/352 X |
| 1,862,269 | 6/1932 | Johnson ....................... 152/330 RF |
| 3,486,547 | 12/1969 | Powers ......................... 152/209 WT |
| 3,841,375 | 10/1974 | Edwards ........................... 152/374 |

FOREIGN PATENTS OR APPLICATIONS 1,928,039   6/1969   Germany ............................ 152/354

Primary Examiner—Drayton E. Hoffman
Attorney, Agent, or Firm—Stevens, Davis, Miller & Mosher

[57] ABSTRACT

A radial ply pneumatic tire for use in a lubricated tire and wheel assembly. The tire has a flat braced tread wider than its wheel rim and a maximum internal section height in the region between the tread edge and a line parallel to the mid-circumferential plane ⅓ of the width of the tread laterally inwardly of the tread edge.

7 Claims, 2 Drawing Figures

TIRES

This invention relates to tires and more particularly to a tire for use in a tire and wheel assembly containing a lubricant to permit use of the assembly with the tire in a deflated state.

According to the invention, a radial ply pneumatic tire comprises a substantially flat ground contacting tread portion wider than the width between flanges of the wheel rim for which the tire is designed and braced by means of a breaker assembly, the tire having an internal profile in which the internal section height of the tire is at a maximum in the region between the respective tread edge and a line, parallel to the mid-circumferential plane, one third of the width of the tread laterally inwardly of the tread edge, the internal section height of the tire at the mid-circumferential plane being less than said maximum.

The effect of the present invention is that the interior of the tire tread has a hump (smooth profile) or ridge (sharp profile) at its center which, during running of the tire in a deflated condition with an internal lubricant, will ensure that centrifugal force flings the lubricant into those regions of the tire in which the primary load-bearing contact between surfaces takes place. This is contact between the interior surface of the tire lower sidewall where it passes over the rim flange and the interior of the tire tread, the tire tread being wider than the distances between the flanges, as previously mentioned, preferably at least 25 per cent wider.

A hump in the internal profile may be achieved by positioning a packing piece beneath the breaker outwardly of the carcass, or by thickening the rubber inwardly of the carcass at the crown region of the tire; in the case of a ridge the latter means would normally be used.

By the expression "radial ply tire" used above is meant a tire whose sidewalls are reinforced by a carcass ply or plies of cords which lie substantially in radial planes. Preferably the carcass ply or plies extend from bead to bead and may consist of a radial ply of steel cords of 90° bias or one or more textile plies of 90° bias or one or more pairs of textile plies of equal and opposite bias angle between 80° or 90°. The carcass ply or plies may or may not follow the internal profile of the tire depending upon whether or not a packing piece to produce a hump is positioned radially outwardly of the carcass. The breaker assembly follows substantially the flat external profile of the tread of the tire rather than the humped internal profile and may comprise a plurality of layers of steel wires of cords, mineral fiber or textile cords of bias angle in the range 0° to 30°. A layer of cords of high bias angle, e.g. 55° to 77° may be provided in addition to these layers if desired.

The tire preferably incorporates low-hysteresis-loss rubber compounds in the sidewalls and/or in the bead region as described in the assignee's U.S. Pat. No. 3,841,375 issued Oct. 15, 1974.

If the radial height of the hump or ridge on the internal profile of the tire relative to the position of maximum internal section height of the tire is a distance H, H is advantageously chosen, together with the width of the hump or ridge, so that the mean slope alpha of the sides of the hump or ridge is between 1° and 10° relative to the tire rotational axis. Preferably, the slope alpha is between 1° and 5°.

The stiffness of the tread and sidewall structure of the tire together with the width of the tread is preferably such that when in use with the tire deflated or substantially deflated and subject to a substantial lateral force one of the said sidewalls will be placed under tension in the region of the contact patch to restrain the tread from lateral movement while the other sidewall will be disposed in a folded state in the said region so as to be capable of acting as a buffer between the flange on a wheel rim on which the tire is mounted and a road surface. Such a tire is described in the assignee's U.S. Pat. No. 3,851,691 issued Dec. 3, 1974.

The tire may have a low aspect ratio, e.g. below 75%, and the sidewalls of the tire may advantageously be thicker than normal for a radial tire, e.g. each sidewall may have a minimum thickness of 5% of the overall width of the tire, at least 25% of the thickness consisting of rubber on the interior of the carcass as described more fully in U.S. Pat. No. 515,245 filed Oct. 16, 1974.

It is important in the use of the tire that the beads should remain in the bead seats when the tire is deflated and should not be able to fall into a well on the wheel rim. If the rim has a well, bead locking means must be provided, e.g. bead spacer units, or movable projections on the wheel rim, or a well cover or filler with or without the locking means as aforesaid. Where the rim is a split rim or a crimped rim, i.e. a rim in which a well is closed by axial compression after the tire is mounted, a particularly useful method of restraining the beads is described in U.S. Pat. No. 3,857,429 issued Dec. 31, 1974.

It is intended that a lubricant is used in the tire to prevent frictional heat build-up if the tire is run deflated. Liquid lubricants suitable for such use are, for example, polyalkylene glycols, although there are many other possibilities, assignee's U.S. Pat. No. 3,739,829 describing many lubricants which may be used for this purpose. It is an advantage of the tire of this invention that the internal profile of the tire causes centrifugal force to propel lubricant to these regions where it is desired. It also enables an adequate film thickness of lubricant to be maintained in the necessary regions of the tire without the need for the same thickness of lubricant across the whole width of the tread, thus enabling less lubricant to be used.

If desired a two part lubricant system may be used such as that described in U.S. Pat. No. 353,928 filed Apr. 24, 1973, where one or more ingredients of a lubricant composition are placed in the interior of the tire and the remaining ingredients are enclosed in an enclosing means to be released into the tire upon deflation. In this case, where an enclosing means is used which is opened by contact with the interior of the tread of the tire such as that illustrated in U.S. Pat. No. 353,938, the interior profile of the tire of this invention may be used to assist in rupturing or impacting the enclosing means.

Figure 2:
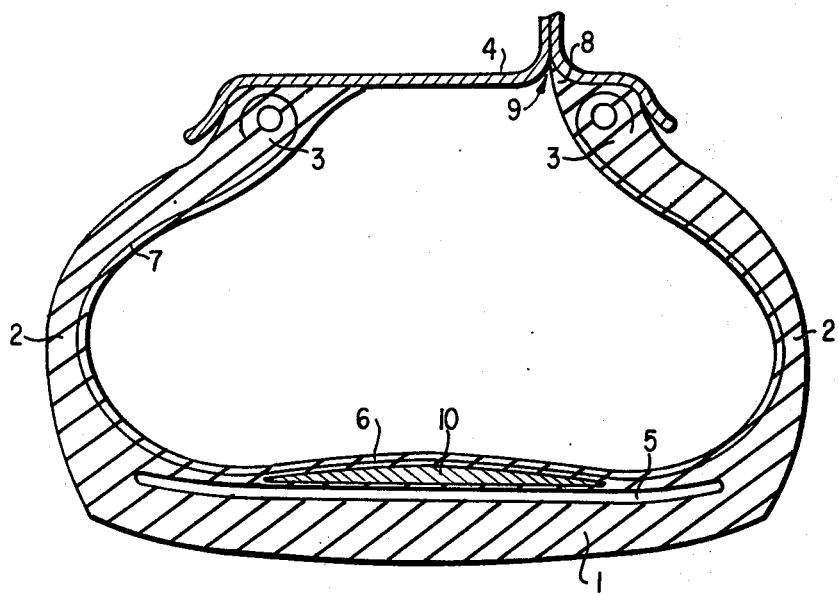

The invention will now be described in more detail, by way of example only, with reference to the accompanying drawing in which FIG. 1 is a diagrammatic cross-section through a portion of a tire and FIG. 2 is a view similar to FIG. 1 but showing another embodiment of the invention.

The tire consists of a tread portion 1, sidewalls 2 and beads 3 and is mounted on a divided rim 4.

The tread portion 1 of the tire is substantially flat and is braced by a breaker assembly 5, and a carcass ply 7 of radially disposed cords extends from bead to bead of the tire, lying inwardly of the breaker assembly 5 in the tread portion. On the inner circumference of tread of the tire is positioned a hump 6 such that the position A of maximum internal height of the tire lies between the tread edge E and a line one third of the width T of the tread inwardly of the tread edge. The mean slope α of the sides of the hump 6 is 4°.

The divided rim 4 has no well into which the beads of the tire can fall and has a notch 9 adjacent the laterally outer bead seat in which a radially inwardly directed extended portion 8 of the toe of the bead 3 of the tire rests. Upon deflation of the tire the toe portion 8 is able to act as a restraint against movement of the bead across the rim since the tilting of the bead which results from a lateral force on the deflated tire compresses the extended portion 8 into the notch 9.

In operation in a deflated condition with a liquid lubricant to reduce internal friction the hump 6 beneath the tread center prevents the liquid lubricant from being flung by centrifugal force to the center of the tread, and directs the lubricant to the interior surface of the tire at the point of maximum internal height A. This is the area of the internal surface of the tire tread where the primary load-bearing contact with the internal surface of the tire sidewall adjacent the wheel rim flange will take place when the tire is fully loaded.

The interior profile of the tire tread thus permits the liquid lubricant to be used more efficiently so that less is required in the tire.

As shown in FIG. 2, the hump 6 in the internal profile may be achieved by positioning a packing piece 10 beneath the breaker assembly 5 outwardly of the carcass ply 7.

Having now described our invention, what we claim is:

1. A radial ply pneumatic tire capable of being operated in a deflated condition, said tire comprising:
   a substantially flat ground contacting tread portion wider than the width between flanges of the wheel rim for which the tire is designed;
   a breaker assembly bracing said tread portion;
   a lubricant in the tire to facilitate said deflated operation;
   an internal profile in which the internal section height of the tire is at a maximum in the region between a respective one of each of the tread edges and a line parallel to the mid-circumferential plane one third of the width of the tread portion laterally inward of the respective tread edge;
   means to direct the lubricant to areas of internal contact of the tire when operating in a deflated condition, said means comprising a circumferentially extending annular protrusion on the internal profile of the tread portion, each side of said protrusion having a mean slope of between 1° and 10° relative to the axis of rotation of the tire and extending axially and radially outwardly from the mid-circumferential plane of the tire and terminating in a respective one of the regions of maximum internal section height.

2. A pneumatic tire according to claim 1 in which the tread of the tire is at least 25% wider than the width between flanges of the wheel rim for which the tire is designed.

3. A pneumatic tire according to claim 1 in which the circumferentially extending annular protrusion in the internal profile of the tire tread is achieved by means of a packing piece beneath the breaker assembly of said tire but outwardly of the radial ply carcass.

4. A pneumatic tire according to claim 1 in which the circumferentially extending annular protrusion in the internal profile of the tire is achieved by thickening the rubber inwardly of the radial ply carcass at the midcircumferential plane of the tire.

5. A pneumatic tire according to claim 1 in which said mean slope is between 1° – 5°.

6. A pneumatic tire according to claim 1 having an aspect ratio less than 75%.

7. A pneumatic tire according to claim 1 wherein: the annular protrusion is triangular in radial cross-section.

* * * * *